United States Patent [19]

Maddern et al.

[11] Patent Number: 4,535,442

[45] Date of Patent: Aug. 13, 1985

[54] DIGITAL SWITCHING NETWORK FOR TELECOMMUNICATIONS EXCHANGE

[75] Inventors: Thomas S. Maddern; John W. Ansell; Alexander S. Philip, all of Dorset, England

[73] Assignee: The Plessey Company plc, Ilford, England

[21] Appl. No.: 487,871

[22] Filed: Apr. 22, 1983

[30] Foreign Application Priority Data

Apr. 24, 1982 [GB] United Kingdom ............... 8211924

[51] Int. Cl.³ ..................... H04T 1/16; H04Q 11/04
[52] U.S. Cl. ........................................ 370/13; 370/58
[58] Field of Search ............................. 370/13, 58, 64

[56] References Cited

U.S. PATENT DOCUMENTS

| 4,074,077 | 2/1978 | Charransol et al. | |
|---|---|---|---|
| 4,075,608 | 2/1978 | Koenig . | |
| 4,096,354 | 6/1978 | Bleickardt et al. | 370/13 |
| 4,201,891 | 5/1980 | Lawrence et al. | |
| 4,393,490 | 7/1983 | Culley | 370/13 |
| 4,397,020 | 8/1983 | Howson | 370/13 |
| 4,425,640 | 1/1984 | Phillip et al. | 370/58 |
| 4,442,502 | 4/1984 | Friend et al. | 370/58 |

FOREIGN PATENT DOCUMENTS

| 1447713 | 8/1976 | United Kingdom . |
|---|---|---|
| 1582456 | 1/1981 | United Kingdom . |
| 2083319 | 3/1982 | United Kingdom . |

Primary Examiner—Douglas W. Olms
Assistant Examiner—Curtis Kuntz
Attorney, Agent, or Firm—Fleit, Jacobson, Cohn & Price

[57] ABSTRACT

A number of methods are used in the prior art to provide speech sample security in a duplicated switch plane telecommunications switching system and these fall into three categories; (i) use the switching planes in a main/standby mode with errors detected by a check code accompanying the speech sample on the plane in use detected errors cause the standby to be switched-to, (ii) transmit speech across both planes simultaneously and compare and (iii) as per (ii) accompanied by a check code to identify the plane at fault. Categories (i) and (iii) require "extra" routes to transmit the check code whereas category (ii) can not detect which sample is in error. In serial transmission switch planes there are no "spare" routes available without creating extra routes for the check code alone. The basic principle of the invention is to pass the speech through one plane only which is known as the "biased to" plane. A checkcode is passed through the other "biased from" plane. Identical routes are used by the speech data and the check code through these respective planes. The check code is generated in the Rx DLT and both the checkcode and the speech date are checked in the Tx DLT. The DLT selects the biased-to plane under the control of the switch control system. The checkcode format used comprises a 4 bit speech checkcode and a 4 bit checkcode check allowing faults in the "biased from" plane to be detected.

9 Claims, 3 Drawing Figures

DIGITAL SWITCHING NETWORK FOR TELECOMMUNICATIONS EXCHANGE

BACKGROUND

The present invention relates to telecommunications exchange switching networks and is more particularly concerned with arrangements for detecting errors in digital switching networks.

It is well established in the prior art to provide duplicated switch block security planes and to operate these networks in one of a number of different modes to permit reconfiguration on a per channel basis in the event of faults occurring on more than one switch block security plane at a time. U.K. Patent Specification No. 1,582,456 shows one such arrangement in which corresponding inlets and outlets on the duplicated switch block security planes are terminated respectively on receive and transmit interfaces of digital line termination units and the receive digital line termination unit interface (RXDLT) is arranged to transmit to both planes for each speech or data sample the sample accompanied by an error indicating code and each transmit digital line termination unit interface (TXDLT) is arranged to compare the sample received from the duplicated switch blocks and if they differ, the error detecting codes accompanying each samples are used to decide which sample should be used for transmission over the outgoing exchange junctions path. Alternative arrangements have been disclosed in U.K. Patent Specification Nos. 1,447,713 and 1,439,568.

The methods of error detection disclosed in the above Patent Specifications involve either the addition of a check code or a plane select bit to the information sample to be transmitted. The addition of extra information requires extra routes additional to the information sample path through the switch blocks. Such an arrangement is readily provided in switch blocks using parallel transmission where the addition of a parity bit for example simply requires n+1 paths, however, in switch blocks using serial transmission the repetition rate of the samples has to be retimed to incorporate the check code or alternatively extra routes dedicated only to the handling of the check code are required.

An alternative arrangement is to transmit the speech sample alone through both of the switch block planes and to compare the received samples. However this requires further analysis by the network control system to "pin down" the fault by, for example, performing a path check on both of the switch block paths used. This of course delays the time to reconfigure around the fault degrading the quality of service of the exchange and requires the use of hardware access connections and associated software/firmware arrangements.

It is a principle aim of the present invention to provide an information sample error detection arrangement for use in a digital switching telecommunications exchange including duplicated switch blocks which overcomes the above identified difficulties.

SUMMARY OF THE INVENTION

According to the invention there is provided a digital telecommunications exchange handling information samples in time division multiplex form carried by incoming and outgoing junction paths, the exchange comprising a receive interface for each incoming junction path and a transmit interface for each outgoing junction path and first and second time division multiplex switching networks, each network providing identical selectable connections in each network between any one of the receive interfaces and any one of the transmit interfaces on a time division muliplex basis and each receive interface includes error code generating means arranged to generate an error indicating code for each information sample received and information sample and checkcode insertion means arranged to pass to one of the switching networks the information sample and to the other switching network the error indicating code and each transmit interface includes error detection means arranged to compare the received error indicating code with the received information sample to detect errors in the received samples.

Typically the receive interface of the digital line termination unit detecting a discrepancy between the received check code and the information sample indicating an information sample corruption, will cause a change in the "biased to" switch block so that subsequent information samples are passed over to the other (non faulty) switching network. Further the check code is arranged in two parts involving (i) an information sample check code and (ii) a check code check. By such an arrangement the error checking procedure in the transmit interface of the digital line termination unit can be performed in two stages. The first stage is used to check the checkcode check against the information sample checkcode. If the entire check code (i.e. both parts) is found to be valid the second stage is performed. The second stage involves the checking of the information sample against the information sample checkcode. If the data and data checkcode are inconsistent a fault exists, however, it could be on either security plane. If the data checkcode and the checkcode check are inconsistent a fault exists on the checkcode security plane. In addition the common control system of the exchange is arranged to generate a switch change bias command and a per channel lock command. This allows individual channels to be loaded to either network on a per channel assignment. All unlocked channels on command from the control system may be biased to either network.

BRIEF DESCRIPTION OF THE DRAWINGS

The invention together with its various features will be more readily understood from the following description of one embodiment thereof, which should be read in conjunction with the accompanying drawings. Of the drawings:

FIG. 2 shows, in block diagram form, the equipment included in the digital line termination units according to the embodiment of the invention, while

DETAILED DESCRIPTION

Figure 1:
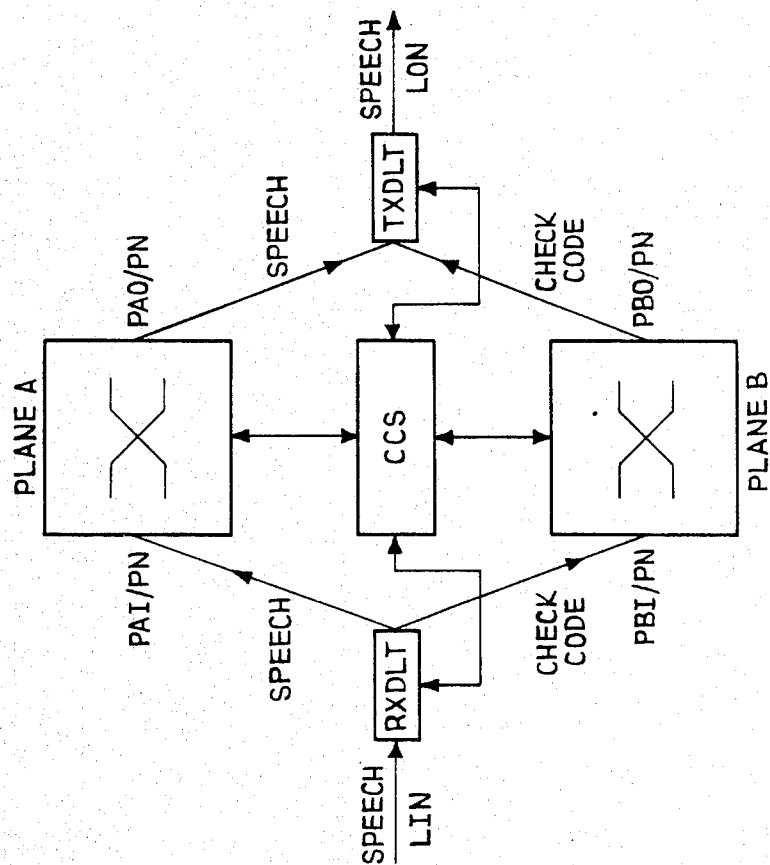
FIG. 1 shows, in simplified form, a digital switching network including the embodiment of the invention.

Referring firstly to FIG. 1 the digital switching telecommunications exchange consists of (i) a number of digital line termination units (RXDLT/TXDLT), one for each line terminated on the exchange, (ii) a pair of switching networks PLANE A and PLANE B and (iii) a common control system CCS. Typically each plane of the switching network may employ switching equipment of the type disclosed in U.K. Patent Application Specification No. 2,083,319.

Figure 2:
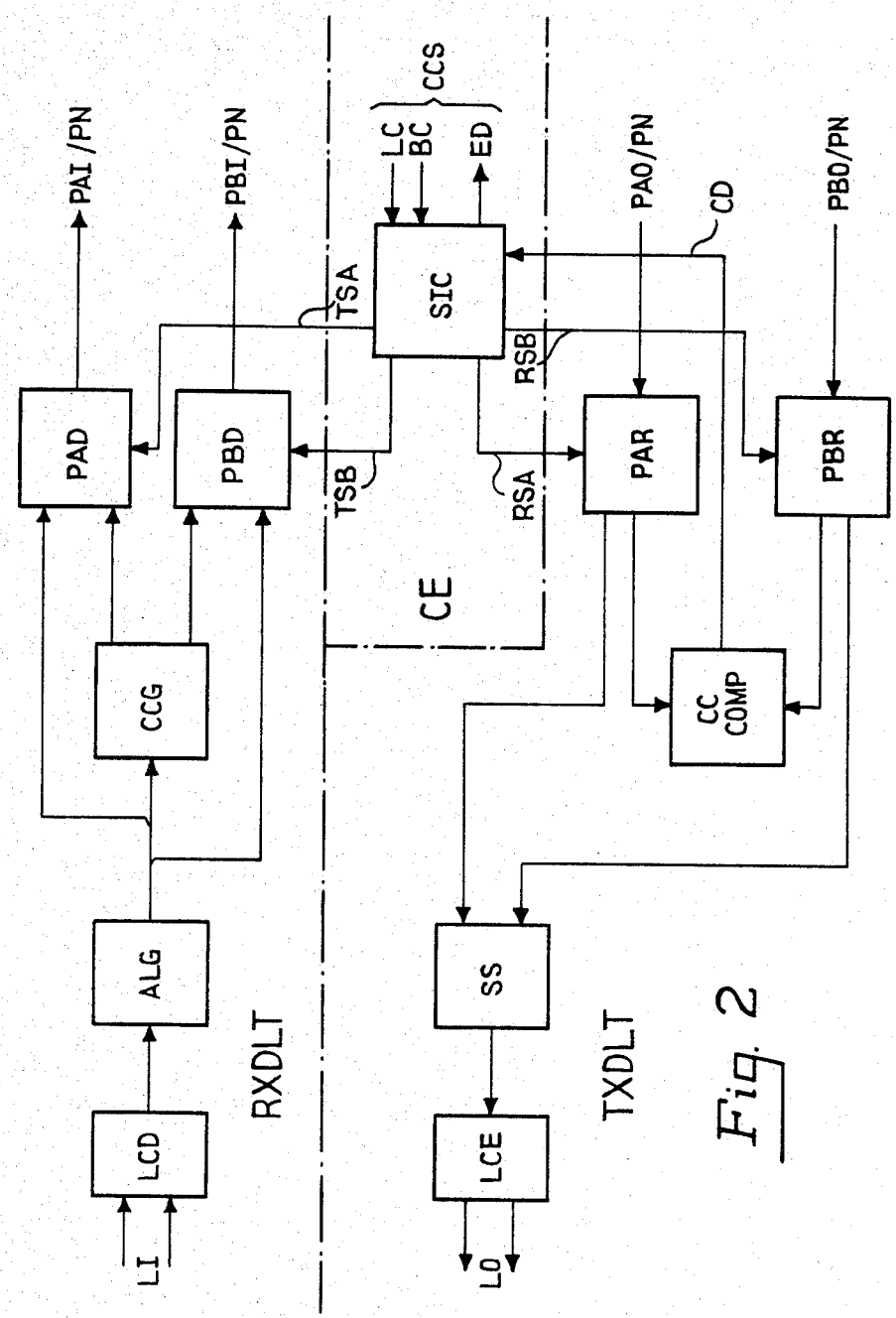

The exchange junction lines, which typically carry pulse code modulation (p.c.m.) encoded thirty-two channel p.c.m. systems are terminated upon a digital line termination unit. Each digital line termination unit includes a receive interface RXDLT and a transmit interface TXDLT and these two interface sections are shown in FIG. 2.

The Switching network of FIG. 1 includes two planes PLANE A and PLANE B. The speech sample is passed through one plane only. This plane is known as the "biased to" plane and in FIG. 1 it is PLANE A for the DLT channel shown. A checkcode is passed through the other (biased-from) plane (ie. PLANE B in FIG. 1). Identical routes are used by the speech data and the checkcode through their respective planes. This simplifies the control of the switch since only one path search is necessary, and essentially only one set of Digital Switching Module instructions need be formatted per call set up.

The checkcode is generated in the RXDLT. Both the checkcode and the speech data are checked in the TXDLT. The DLT selects the "biased to" plane under the command of the common control system CCS.

A speech data error detected on the biased to plane causes the control system CCS to change the "biased to" plane by sending a "change bias" command. The results of the change are monitored by the control system. These results are used by the fault location programmes to locate the faulty resource and re-configure around it.

Figure 3:
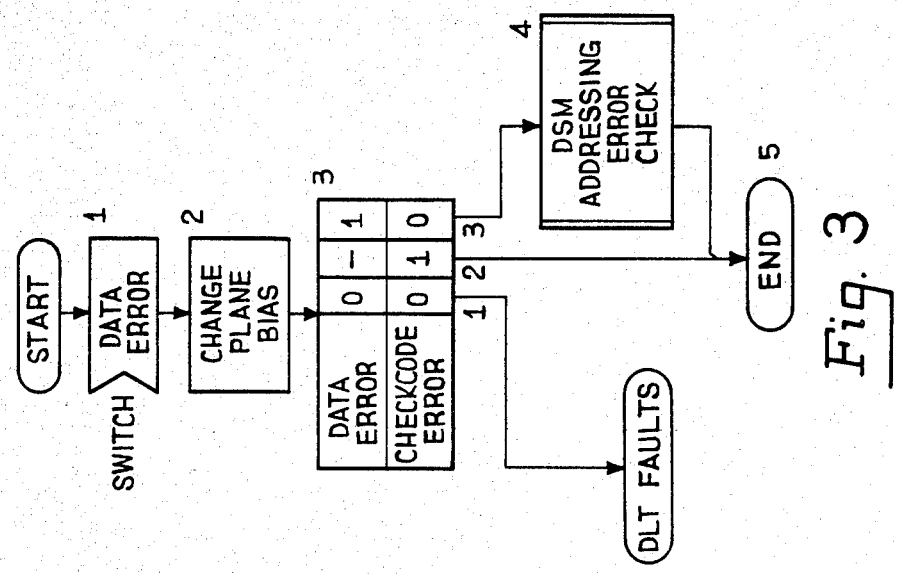
FIG. 3 shows a flow diagram of the operations performed when an error is detected.

The control sequence, following a change of the plane biased to as a result of a speech data error, is shown in the Flowchart of FIG. 3.

The exchange shown in FIG. 1 has been greatly simplified for ease of presentation. It will of course be appreciated that each incoming junction path to the exchange, of which only one is shown in FIG. 1, is terminated upon an individual receive interface of a digital line termination unit whereas the corresponding outgoing junction path is terminated by the transmit interfaces of the same digital line termination unit.

Each digital line termination unit consists as has previously been stated, of a receive interface RXDLT and a transmit interface TXDLT and a control equipment section CE. The receive interface RXDLT comprises (as shown in FIG. 2) a line signal decoding equipment LCD and a local exchange aligner ALG, together with plane A and plane B driver equipments PAD and PBD and a check code generator CCG. The plane drivers PAD and PBD are controlled by signals from the switch block interface control SIC to select the plane over which the speech sample and the check code is to be sent.

The check code, which is the same size as an information sample, consists of eight bits divided into two parts, the speech check code SCC and the check code check CCC.

The speech checkcode is generated from the eight speech bits in the RXDLT, therefore it is a direct function of the speech. The checkcode check is, in turn, a direct function of the speech checkcode and is also generated in the RXDLT. These two generating functions of the speech checkcode, and of the checkcode check will be chosen for their simplicity and for their effectiveness. The checkcode is generated in the checkcode generator CCG in the receive interface and injected into the appropriate plane driver in accordance with the selection signals TSA and TSB.

The transmit interface TXDLT comprises a pair of information sample receivers PAR (for plane A) and PBR (for plane B), a check code comparator CC COMP, a sample selection switch SS and line encoding equipment LCE. The receiver selected to receive the speech sample is controlled by the switch block interface control SIC through signals RSA and RSB. The SIC decides for each channel the "biased to" plane which will carry the speech sample. The other plane (the biased from plane) carries the check code. Accordingly for each channel the SIC conditions the PAD and PBD and PAR and PBR.

The error checking is performed in two stages. The first stage is the checking of the checkcode check against the speech checkcode. If there is a fault, the speech data itself is taken to be uncorrupted, since the speech sample cannot be checked against a faulty checkcode. The control system is informed on lead ED and a fault analysis conducted on the plane biased from and other related resources by the control system CCS. If the entire checkcode (checkcode check and speech checkcode) is found to be valid, the check code comparator CC COMP in the TXDLT moves on to the second stage of the error checking process.

The second stage involves the checking of the speech sample against the speech checkcode. If there is a fault the speech sample itself is taken to be corrupted (the speech checkcode already having been validated), the control system CCS is informed again using lead ED. The plane "biased-to" is changed and the control sequence in FIG. 3 is executed. Otherwise validation is complete.

Reference to FIG. 3 shows, in step 1 that a data error is detected in the digital switch, by the DLT. A data error occurs when the speech and speech checkcode do not correspond but the speech check code and the checkcode check are consistent. Step 2 causes the control system CLS to issue a change plane bias command on lead BC in FIG. 2. Step 3 is the flow diagram switch which is controlled by the new results after the change of bias. Path 1 will be used if a fault has been reported but no discrepancy found between the check code and the speech sample as the fault was for example transient. Path 2 is used when the checkcode is found to be in error and path 3 is used when the data error persists after changing the plane "biased to". In the later case the switch block addressing must be checked and this is performed by the control system CCS.

The control hardware SIC is used for directing the speech and checkcode into the relevant planes. Change overs are made under the command of the control system CCS. There are two basic commands:

(i) The lock command (lead LC)

These commands are sent on a per channel basis to each DLT, according to how the control system has reconfigured around a located (but perhaps not yet diagnosed) fault. Each command is an instruction to the RXDLT to send the speech sample of a particular channel only, across plane A or plane B, depending on where the fault is located, and to the TXDLT stating on which plane a speech sample is expected to arrive from. Once a path has been 'locked' to a particular plane it will not be changed over as a result of a bias command until it is 'unlocked'. The control hardware CIS is arranged to store the lock information for each channel served by the DLT.

(ii) Change bias command (lead BC)

This is a broadcast command to every DLT instructing it to change over the speech and checkcode insertion planes for each 'unlocked' channel. The broadcast command enables the control system to reconfigure around a fault soon after it has been detected.

The fault handling cycle breaks down into the following sequence:

(i) Normal operation—(ii) Speech transmission error—(iii) Change bias if speech plane fault—(iv) Fault located—(v) reconfigure by locking affected channels at the DLT—(vi) Diagnose and repair fault—(vii) Normal operation.

The flow chart of FIG. 3 covers the above cycle up to and including item (iv) "fault located". Primarily the method of checking of the invention is expected to detect data faults and so a checkcode error is expected to appear as a result of a speech data error since it is the checkcode which is being sent across the plane causing corruption.

Addressing faults may be established by the method according to the invention, for example DSM control store errors. Such an error would cause corrupted speech data to persist even when the bias had been changed. Since double faults are taken to be unlikely (another possible cause) the DSM control store or the DLT itself are taken to be the likely faults.

A timing problem may exist when changing bias due to the delay through the switch. If both the receive DLT and the transmit DLT changeover at the same time some data samples in transit through the switch will be biased the wrong way which would cause data errors. This is solved by using the following change bias sequence.

(a) Disable all fault reporting
(b) Instruct RXDLT to transmit data on both planes
(c) Wait for maximum transmit delay through the switch network
(d) Instruct TXDLT to change biased to plane
(e) Instruct RXDLT to change biased-to plane
(f) Wait for maximum transmit delay through the switch network
(g) Enable all data fault reporting.

It will be appreciated that it is not intended to limit the invention to the above example only, many variations, such as might readily occur to one skilled in the art, being possible, without departing from the scope thereof as defined by the appended claims.

What we claim is:

1. A digital telecommunications exchange handling information samples in time division multiplex form carried by incoming and outgoing junction paths, the exchange comprising:

a receive interface for each incoming junction path;
a transmit interface for each outgoing junction path;
first and second time division multiplex switch networks, each network being controlled by a common control system to provide identical selectable connections in each network between any one of the receive interfaces and any one of the transmit interfaces on a time division multiplex basis;
each receive interface includes error code generating means for generating a first error indicating code dependent upon each information sample received thereby and for generating a second error indicating code which is a function of said first error indicating code, said first and second error indicating codes defining a checkcode, and each receive interface includes information sample and checkcode insertion means arranged to pass to one of the switching networks said information sample and to the other switching network said checkcode;
each transmit interface includes error detection means for comparing the first error indicating code with the second error indicating code both defining said checkcode received via said other switching network and includes means for validating the information sample received via said one of the switching networks against said first error indicating code after the successful comparison by said means for comparing to detect errors in said information samples received via said one of the switching networks; and
said common control system having means for selecting the switching network dependent upon said means for comparing and said means for validating.

2. A digital telecommunications exchange according to claim 1 in which said common control system is instructed by said means for validating in said transmit interface when an error is detected between said first error indicating code and said information sample received via said one of the switching networks, said common control system having means for issuing a change bias command which causes the digital line termination unit to change over said information sample and checkcode insertion means to change the switching networks respectively carrying said information sample and said checkcode.

3. A digital telecommunications exchange according to claim 2 in which the digital line termination units include locking means for locking a channel to a particular switching network and said locking means being activated by a means for generating a lock command as part of said common control system dependent upon said means for comparing and said means for validating.

4. A digital telecommunications exchange according to claim 3 in which said common control system broadcasts said change bias command to all digital line termination units when one of the digital line termination units detects an information sample transmission error.

5. A digital telecommunications exchange according to claim 4 in which each digital line termination unit upon reception of said change bias command activates said information sample and checkcode insertion means to change over the switching networks for each unlocked channel.

6. A digital telecommunications exchange according to claim 1 in which said check code is arranged in two parts wherein said first and second error indicating codes correspond respectively to an information sample check code and a check code check.

7. A digital telecommunications exchange according to claim 6 in which said error detection means in a digital line termination unit operates in two stages, the first of which checks the check code check against the information sample check code.

8. A digital telecommunications exchange according to claim 7 in which the second stage which occurs in said means for validating is only performed if the check code is found to be valid due to a successful comparison.

9. A digital telecommunications exchange according to claim 8 in which the second stage involves the checking of the information sample received against the information sample check code.

* * * * *